United States Patent
Poder

(10) Patent No.: US 8,555,480 B2
(45) Date of Patent: Oct. 15, 2013

(54) TWO PART COUPLING CONNECTED BY A CLIP

(75) Inventor: Philippe Poder, Guichen (FR)

(73) Assignee: Parker Hannifin France SAS, Ville-la-Grand (FR)

( * ) Notice: Subject to any disclaimer, the term of this patent is extended or adjusted under 35 U.S.C. 154(b) by 98 days.

(21) Appl. No.: 13/115,661

(22) Filed: May 25, 2011

(65) Prior Publication Data

US 2011/0271515 A1    Nov. 10, 2011

Related U.S. Application Data

(63) Continuation of application No. PCT/FR2009/001334, filed on Nov. 20, 2009.

(30) Foreign Application Priority Data

Nov. 20, 2008    (FR) .................................... 08 06603

(51) Int. Cl.
*B23P 11/00* (2006.01)
*F16L 21/08* (2006.01)

(52) U.S. Cl.
USPC ............................. 29/525.01; 285/403

(58) Field of Classification Search
USPC ............ 29/525.01, 450, 451, 453, 469, 505, 29/516, 525.05, 237; 285/403, 305, 317, 285/308, 319
See application file for complete search history.

(56) References Cited

U.S. PATENT DOCUMENTS

| | | | | |
|---|---|---|---|---|
| 5,374,088 A | * | 12/1994 | Moretti et al. | 285/305 |
| 5,568,946 A | * | 10/1996 | Jackowski | 285/38 |
| 6,139,214 A | | 10/2000 | Zirps et al. | |
| 7,316,425 B2 | * | 1/2008 | Poder | 285/93 |

FOREIGN PATENT DOCUMENTS

| | | |
|---|---|---|
| DE | 37 29 570 A1 | 3/1988 |
| FR | 2 908 494 A1 | 5/2008 |
| FR | 2 910 109 A1 | 6/2008 |
| GB | 2 265 428 A | 9/1993 |

OTHER PUBLICATIONS

International Search Report and Written Opinion in corresponding International Application No. PCT/FR2009/001334.

* cited by examiner

*Primary Examiner* — John C Hong
(74) *Attorney, Agent, or Firm* — John A. Molnar, Jr.

(57) ABSTRACT

A coupling formed of a tubular body defining an internal channel. The body is formed of a first part for connecting the channel to a circuit element and a second part defining a housing for a pipe end, the first and second parts including mutually engaged end portions, wherein the housing extends into the end portion of the second part and the end portions include facing openings for receiving a clip element for securing the parts to each other. The opening of the second part opens into the housing and the clip element has a locking portion that is elastically deformable from a retaining state to a free state for extracting the clip element. The clip element projects into the housing such that the pipe end prevents the locking portion from deforming to its free state and being extracted.

19 Claims, 3 Drawing Sheets

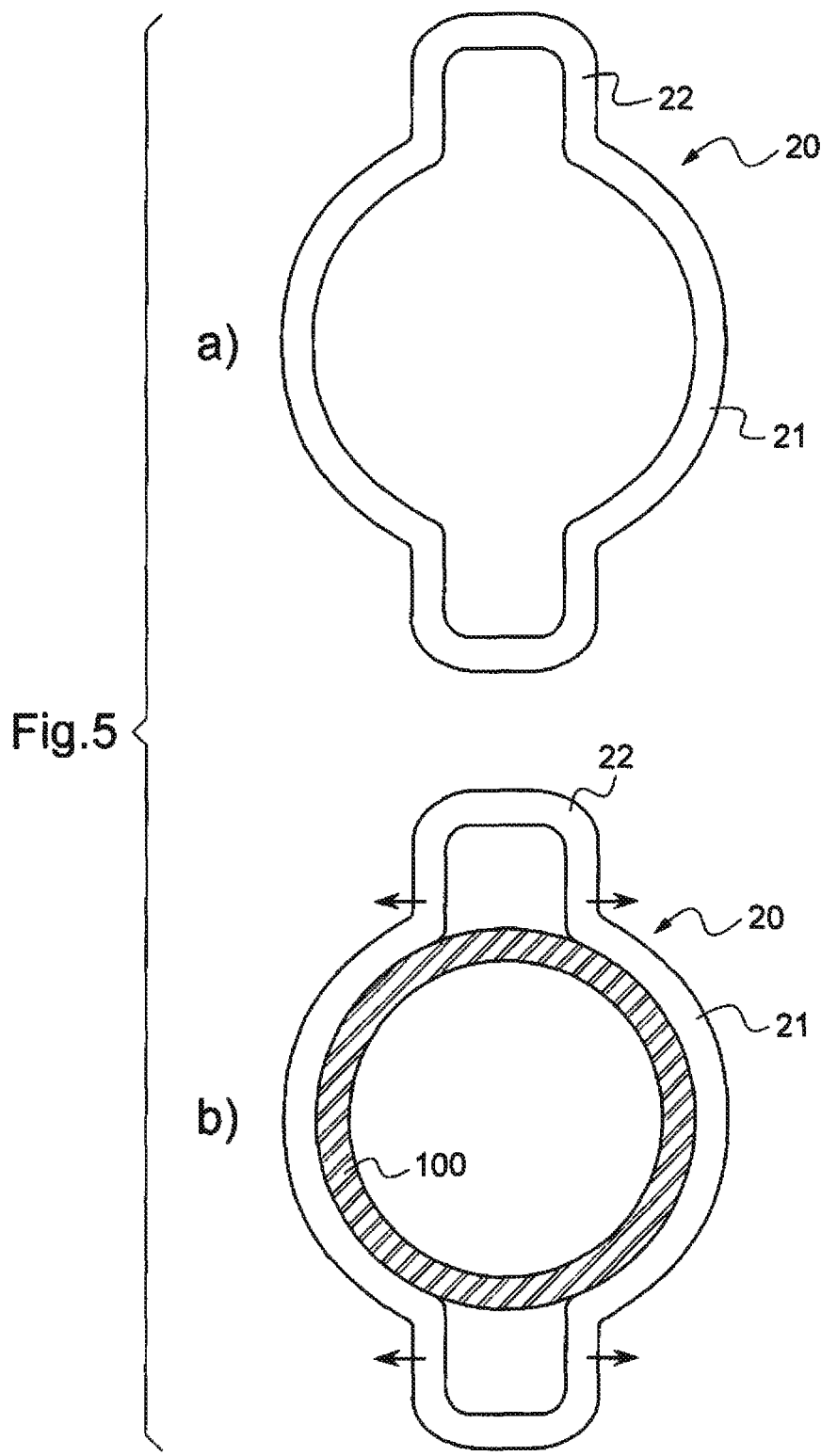

TWO PART COUPLING CONNECTED BY A CLIP

CROSS-REFERENCE TO RELATED APPLICATIONS

The present application is a continuation of International Application No. PCT/FR2009/001334, filed Nov. 20, 2009 and which designated the United States, and which claims priority to French Application No. 08 06603, filed Nov. 25, 2008, the disclosure of each of which is expressly incorporated herein by reference.

BACKGROUND OF THE INVENTION

The present invention relates to a coupling suitable for use in connecting together two pipes, such as for example pieces of pipework or one piece of pipework and a member for delivering or receiving fluid such as a pump, a manifold, an actuator, a flow-rate or pressure regulator, a reservoir Couplings are known, in particular from documents FR-A-2 908 494 and FR-A-2 910 109, that comprise a body defining an internal channel and made up of two body parts each having means for connecting the channel to a pipe. The connection means may be of various types, e.g. including a male tubular section having teat or Christmas tree-shaped teeth for engaging by force inside the pipe, a female tubular section provided with a toothed washer or a clamp for quick-coupling the pipe, a latch that is movable radially relative to the body. The body is made as a single molding, but that prevents making the coupling in a modular manner in order to simplify fabrication. It is necessary to provide a plurality of molds for fabricating bodies that associate the various types of connection that are in use.

Other couplings are known in which the body is made up of two independent parts. The body parts then have end portions arranged to enable the first and second parts to be mutually engaged and secured to each other. The end portions have means for mutually retaining each other such as snap-fastener means or clip-fastener means operating in an axial engagement direction. Unfortunately, most of the forces that act externally on such a coupling have an axial component. This means that the strength of the connection between the body parts is relatively weak.

SUMMARY OF THE INVENTION

An aspect of the invention is to provide an alternative to the modes for connecting together the body parts.

To this end, the invention provides a coupling comprising a tubular body defining an internal channel and made up of a first connection part for connecting the channel to a circuit element and a second connection part defining a housing for a pipe end, the first and second parts having end portions arranged to enable them to be mutually engaged so as to secure the first and second parts to each other. The housing extends into the end portion. The end portions include through openings in register to receive a clip element for clipping the parts together, the opening in the second part opening out into the housing. The clip element comprises a locking portion that is movable from a retaining state for retaining the clip element in position to a free state for extracting the clip element, which clip element projects into the housing in such a manner that the pipe end prevents the locking portion from being deformed towards its free state for extraction.

Thus, the clip element provides a firm and strong connection between the body parts, and the pipe end reinforces this connection by preventing the clip element from being withdrawn.

In a particular embodiment, the clip element includes a lug for extending in the openings, and the locking portion of the clip element has two arms extending in circular arcs from the lug and, preferably, the lug is substantially U-shaped and has branches that extend to form the arms of the locking portion, the arms advantageously joining together to form a circle.

The clip element can thus be made easily by molding a thermoplastic material or by plastically deforming a metal rod.

Also advantageously, the end portions include a plurality of openings to allow the body parts to be mutually engaged in a plurality of relative angular positions and, preferably, the openings are arranged so as to allow four orientations that are at 90° from one another.

This is particularly advantageous when one of the two body parts is not symmetrical, for example contains a bend, with it then being possible for the bend to be oriented in various ways so as to facilitate installing the coupling in a circuit by adapting the shape of the coupling to its surroundings.

Other characteristics and advantages of the invention appear on reading the following description of particular, non-limiting embodiments of the invention.

The present invention, accordingly, comprises the construction, combination of elements, and/or arrangement of parts and steps which are exemplified in the detailed disclosure to follow.

BRIEF DESCRIPTION OF THE DRAWINGS

Reference is made to the accompanying drawings, in which:

FIG. 5 is a view showing the clip element before a) and after b) introducing the pipe end.

Figure 1:
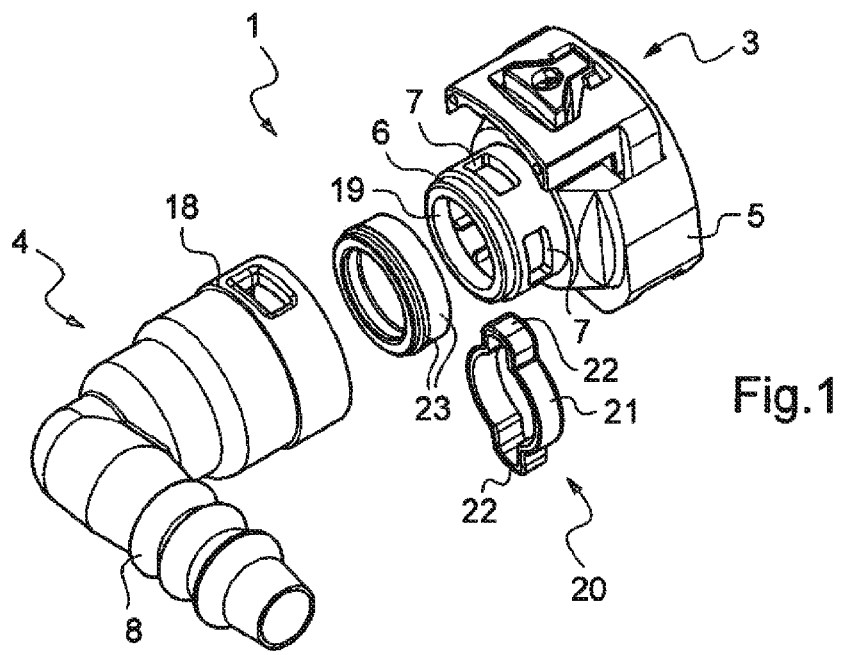
FIG. 1 is a partially-exploded perspective view of a coupling in accordance with the invention.

The drawings will be described further in connection with the following Detailed Description of the Invention.

DETAILED DESCRIPTION OF THE INVENTION

With reference to the figures, the coupling in accordance with the invention comprises a body given overall reference 1 that is of tubular shape defining an internal channel 2, and that is arranged to connect the internal channel 2 to two pipes, e.g. forming parts of members of a fluid circuit, such as pipework, a manifold, an actuator, a tank. The channel 2 has an end chamber forming a housing 19 for one end 100 of one of the pipes. The housing 19 is stepped, and it possesses a minimum diameter that is greater than the diameter of the internal channel 2 (the minimum diameter of the housing 19 is slightly greater than the outside diameter of the pipe end 100), and a maximum diameter beside its inlet.

The body 1 comprises first and second body parts given respective overall references 4 and 3. The first body part 4 and the second body part 3 thus define respective segments of the internal channel 2.

The body part 3 possesses a first end portion 5 arranged as a female connection portion for connection to the pipe end 100 for connecting said pipe to the internal channel 2, and at its opposite end, it possesses a second end portion 6 arranged as a male connection portion for connection to the body part 4. The housing 19 extends over the entire length of the body part 3 and opens to the outside beside the end portion 5 via its maximum-diameter portion that presents an inlet orifice for admitting the pipe end 100 into the coupling. The end portion 5 is provided with connection means that are themselves known and that here comprise a radially-movable latch for co-operating with an external portion in relief on the pipe end 100. The end portion 6 is formed by a tubular wall having four through openings 7 that are disposed symmetrically at 90° from one another so as to open out transversely into the housing 19.

The body part 4 possesses a first end portion 8 arranged as a male connection portion for connection to the end of the other pipe in order to connect said pipe to the internal channel 2, and at its opposite end, it possesses a second end portion 18 arranged at a female connection portion for connection to the body part 3. The first body part 4 has a bend such that the male end portion 8 is at an angle of 90° relative to the end portion 18. The end portion 8 is provided with connection means, here outwardly-projecting Christmas tree-shaped teeth, and it is arranged to be forcibly engaged in said end of said pipe. The end portion 18 defines the end 19.1 of the housing 19 that is connected to the channel 2 via a shoulder that forms an abutment for the pipe end 100 and that also defines a chamber 10 for receiving the end portion 6. The housing 19 receives sealing elements 23 beside the end portion 8, which sealing elements serve to clamp onto the pipe end 100 that is to be retained by the connection means of the body part 3. The wall of the end portion 18 defining the chamber 10 is provided with two through openings 9, disposed symmetrically at 180° from each other.

The coupling of the invention also includes a clip element 20 having a locking portion 21 of annular shape and two diametrically-opposite lugs 22.

More precisely, the clip element 20 is in the form of an elongate element shaped to define the two lugs 22 of U-shape with branches that are rounded towards the outside and that are joined together to form the locking portion 21. The locking portion 21 has an outside diameter substantially equal to the inside diameter of the end portion 6, and an inside diameter that is slightly smaller than the outside diameter of the pipe end 100. The locking portion 21 is elastically deformable from a rest state in which the outside diameter is substantially equal to the inside diameter of the end portion 6, and a flattened state in which the transverse dimension of the clip element (measured perpendicularly to a middle axis passing through the lug 22) is no greater than the dimension of the openings 7, 9 (measured perpendicularly to the central axis of the coupling).

Figure 2:
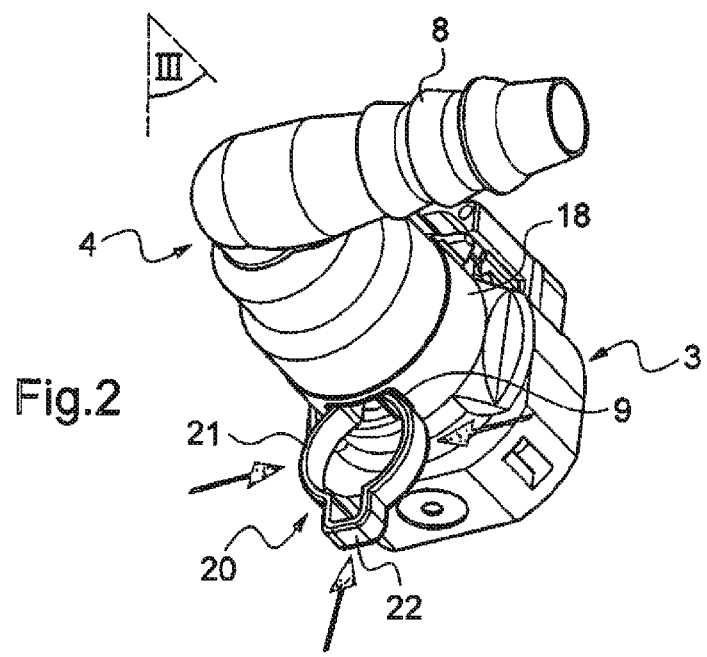
FIG. 2 is a perspective view showing the clipping of the parts of the coupling.

Assembling the coupling amounts to engaging the end portion 6 axially into the chamber 10, while causing the openings 7 and the opening 9 to correspond (FIG. 2).

Figure 3:
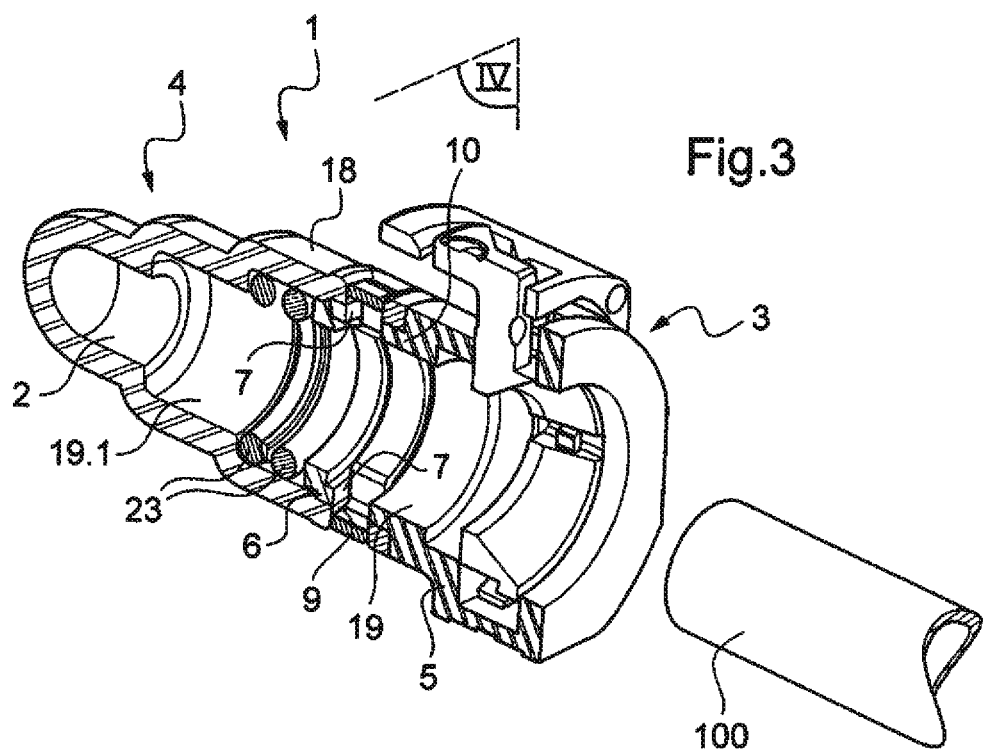
FIG. 3 is a view of the coupling shown in perspective and in longitudinal section on plane III of FIG. 2.
Figure 4:
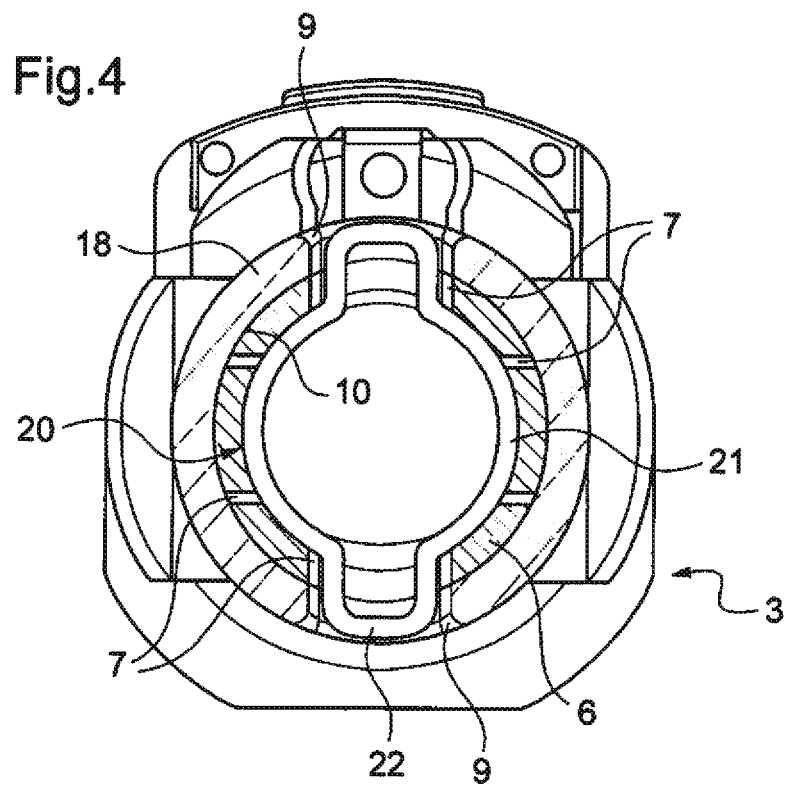
FIG. 4 is a view of the coupling in cross-section on plane IV of FIG. 3.

The clip element 20 is then put into place. To do this, the cocking portion 21 of the clip element is flattened to enable it to be inserted in the housing 19 by passing through an opening 9 and a facing opening 7. Once it has passed through the openings, the locking portion 21 returns to its previous shape and extends transversely inside the housing 19 (FIGS. 3 and 4). The lugs 22 are received in two pairs of facing openings 7, 9, said pairs being diametrically opposite. The clip element 20 thus constitutes an element for pinning the coupling parts to each other.

When the pipe end 100 is inserted into the coupling, the pipe end 100 engages in the locking portion 21 and thus prevents said locking portion from flattening, thereby opposing extraction of the clip element 20. The pipe end 100 is engaged by force in the locking portion 21. The clip element is thus constrained against the body and against the pipe end, which is deformed thereby, thus enabling assembly clearances to be accommodated and possibly ensuring electrical conductivity between the pipe end and the coupling.

More precisely, by comparing FIGS. 5a) and 5b) it can be seen that engaging the pipe end 100 by force causes the branches of the lugs 22 to be spaced apart and thus to be pressed against the two opposite side walls of the openings 7, 9, thus ensuring contact. This putting onto contact serves to eliminate operating clearances and thus ensures electrical continuity assuming that the clip element, the body parts, and the pipe ends are made of electrically conductive materials (e.g. conductive polymer or metal), thereby enabling any electrical charge that might accumulate in the fluid transport circuit to be dissipated.

The first body part 4 has a bend so that the male end portion 8 is at an angle of 90° relative to the end portion 18.

It can be understood that the symmetrical arrangement of the openings 7 at 90° to one another makes four orientations possible for the body parts relative to each other, thus making it possible to select the orientation of the latch in the second body part 3 relative to the male end portion 8 of the second body part 4 so as to enhance accessibility to the latch as a function of the surroundings of the coupling.

Naturally, the invention is not limited to the embodiments described, but covers any variant coming within the ambit of the invention as defined by the claims.

In particular, the number and the positions of the openings 7, 9 could be different from those described above. The number and the positions of the lugs and of the grooves could also be modified, e.g. as a function of the number of possible angular orientations that it is desired to have between the body parts.

Other connection means could be used, and in particular optionally quick-connection means, means for forced mutual engagement, or clip-fastener means, a toothed washer, an attachment clamp. The coupling may have two male ends or two female ends.

The connection between the first body part and the second body part may be made either upstream from the sealing elements 20 as described above ("upstream" relative to the insertion direction of the pipe end into the chamber of the first end portion), or else downstream from said sealing elements, but it is then necessary to provide additional sealing elements between the first body part and the second body part.

The clip element may be of a shape that is different from that shown, and for example it may be in the shape of a hairpin. The clip element then has one lug from which two diverging branches extend so as to form the locking portion. The branches are elastically deformable towards a release state in which they are parallel to each other so as to allow the locking portion into the openings. When the pipe end is engaged in the coupling, the two branches are held captive between the wall of the coupling and the pipe end, thereby preventing the branches from being deformed towards their release state.

The coupling could be rectilinear.

In a variant, the locking portion 21 could be plastically deformable or it could be hinged so as to be movable between its two states.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A coupling for connecting an element of a fluid circuit in fluid communication to a pipe having a pipe end, the coupling comprising:
   a generally tubular body having an internal body channel therethrough, the body comprising:
      a first body section extending axially between a first end portion couplable to the element for connecting the element in fluid communication with the body channel, and a second end portion formed by a tubular first wall having a first opening therethrough; and
      a second body section extending axially between a first end portion couplable to the pipe for connecting the pipe in fluid communication with the body channel, and a second end portion formed by a tubular second wall having a second opening therethrough, one of the second end portion of the first or the second body section being received coaxially in the second end portion of the other body section to define a chamber, with the first and the second opening being aligned in registration, and
   a clip received in the chamber, the clip having a generally annular locking portion deformable from a normal state to a flattened state, the clip in the flattened state of the locking portion being insertable through the aligned first and second openings into the chamber, and the clip returning in the chamber to the normal state of the locking portion with the locking portion extending transversely in the chamber,
   whereby with the pipe end being received in the chamber coaxially through the clip, the deformation of the clip locking portion from the normal state to the flattened state is delimited by the pipe so as to prevent the clip from being extracted from the body.

2. The coupling of claim 1 wherein the clip has a first end configured as a first lug, the first lug extending into the first and the second opening as aligned in registration to thereby prevent the first and the second body portion from being separated.

3. The coupling of claim 2 wherein the first lug is generally U-shaped.

4. The coupling of claim 3 wherein the clip has a pair of arcuate branches extending from opposite sides of the first lug, the branches defining the locking portion of the clip.

5. The coupling of claim 2 wherein:
   the first wall has a diametrically opposed pair of said first openings therethrough, and the second wall has a diametrically opposed pair of said second openings therethrough, each of the first openings being aligned in a registered pair with a corresponding one of the second openings; and
   the clip further has a second end disposed diametrically opposite the first end and configured as a second lug, whereby each of the first and the second lug extends into a corresponding one of the registered pairs of the first ad the second openings.

6. The coupling of claim 1 wherein the locking portion is generally circular.

7. The coupling of claim 1 wherein the clip locking portion is elastically deformable from the normal state to the flattened state.

8. The coupling of claim 1 wherein at least one of the first and the second wall has a plurality of said first or said second opening therethrough, each of said plurality of said first or said second opening being registrable sequentially with each of the other ones of said first or said opening so as to dispose one of the first or the second body section at different angular orientations relative to the other one of the first or the second body section.

9. The coupling of claim 8 wherein the first and second openings are arranged so as to allow the disposition of the one of the first or the second body section at four orientations that are spaced-apart at 90° from one another.

10. A method of making a coupling for connecting an element of a fluid circuit in fluid communication to a pipe having a pipe end, the coupling comprising a generally tubular body having an internal body channel therethrough, the method comprising the steps of:
   (a) providing a first body section extending axially between a first end portion couplable to the element for connecting the element in fluid communication with the body channel, and a second end portion formed by a tubular first wall having a first opening therethrough;
   (b) providing a second body section extending axially between a first end portion couplable to the pipe for connecting the pipe in fluid communication with the body channel, and a second end portion formed by a tubular second wall having a second opening therethrough;
   (c) providing a clip having a generally annular locking portion deformable from a normal state to a flattened state;
   (d) receiving one of the second end portion of the first or the second body section coaxially in the second end portion of the other body section to define a chamber;
   (e) aligning the first and the second opening in registration;
   (f) deforming the clip from the normal state to the flattened state; and
   (g) inserting the clip in the flattened state of the locking portion through the aligned first and second openings into the chamber, the clip returning in the chamber to the normal state of the locking portion with the locking portion extending transversely in the chamber.

11. The method of claim 10 further comprising the additional step:
   (h) receiving the pipe end in the chamber coaxially through the clip, the deformation of the clip locking portion from the normal state to the flattened state being delimited by the pipe so as to prevent the clip from being extracted from the body.

12. The method of claim 10 wherein the clip has a first end configured as a first lug, the first lug extending in step (g) into the first and the second opening as aligned in registration to thereby prevent the first and the second body portion from being separated.

13. The method of claim 12 wherein the first lug is generally U-shaped.

14. The method of claim 13 wherein the clip has a pair of arcuate branches extending from opposite sides of the first lug, the branches defining the locking portion of the clip.

15. The method of claim 12 wherein:
   the first wall has a diametrically opposed pair of said first openings therethrough, and the second wall has a diametrically opposed pair of said second openings therethrough, each of the first openings being aligned in step (e) in a registered pair with a corresponding one of the second openings; and the clip further has a second end disposed diametrically opposite the first end and configured as a second lug, whereby in step (g) each of the first and the second lug extends into a corresponding one of the registered pairs of the first ad the second openings.

16. The method of claim 10 wherein the locking portion is generally circular.

17. The method of claim 10 wherein the clip locking portion is elastically deformed in step (f) from the normal state to the flattened state.

18. The method of claim 10 wherein at least one of the first and the second wall has a plurality of said first or said second opening therethrough, each of said plurality of said first or said second opening being registrable in step (e) sequentially with each of the other ones of said first or said opening so as to dispose one of the first or the second body section at different angular orientations relative to the other one of the first or the second body section.

19. The method of claim 18 wherein the first and second openings are arranged so as to allow in step (e) the disposition of the one of the first or the second body section at four orientations that are spaced-apart at 90° from one another.

* * * * *